US008005519B2

(12) United States Patent
Kang et al.

(10) Patent No.: US 8,005,519 B2
(45) Date of Patent: Aug. 23, 2011

(54) CAPACITOR ASSEMBLY AND COMMUNICATIONS DEVICE INCLUDING THE CAPACITOR ASSEMBLY

(75) Inventors: Kai Kang, Shanghai (CN); Zheng-Zhuang Wang, Beijing (CN); Guang Ping Zhou, Beijing (CN)

(73) Assignee: Motorola Mobility, Inc., Libertyville, IL (US)

( * ) Notice: Subject to any disclaimer, the term of this patent is extended or adjusted under 35 U.S.C. 154(b) by 455 days.

(21) Appl. No.: 11/911,220

(22) PCT Filed: Apr. 13, 2006

(86) PCT No.: PCT/US2006/013971
§ 371 (c)(1),
(2), (4) Date: Oct. 15, 2008

(87) PCT Pub. No.: WO2006/113384
PCT Pub. Date: Oct. 26, 2006

(65) Prior Publication Data
US 2009/0213524 A1 Aug. 27, 2009

(30) Foreign Application Priority Data
Apr. 13, 2005 (CN) .......................... 2005 1 0064996

(51) Int. Cl.
*H04B 1/38* (2006.01)
*H04M 1/00* (2006.01)
(52) U.S. Cl. ................ 455/575.1; 455/90.3; 379/433.07
(58) Field of Classification Search ................ 455/90.3, 455/575.1, 575.3–575.4; 379/433.07; 345/168–169
See application file for complete search history.

(56) References Cited

U.S. PATENT DOCUMENTS

| 5,847,336 | A | * | 12/1998 | Thornton ...................... 200/5 A |
| 6,127,979 | A | | 10/2000 | Zhou et al. |
| 6,614,905 | B1 | * | 9/2003 | Kristensen .................... 379/368 |
| 6,633,241 | B2 | * | 10/2003 | Kaikuranta et al. ............ 341/33 |
| 6,806,815 | B1 | * | 10/2004 | Kaikuranta et al. ............ 341/22 |
| 6,873,291 | B2 | * | 3/2005 | Aoyama et al. ......... 343/700 MS |
| 6,924,789 | B2 | | 8/2005 | Bick ............................. 345/168 |
| 7,148,851 | B2 | * | 12/2006 | Takaki et al. .................. 343/702 |
| 7,151,528 | B2 | * | 12/2006 | Taylor et al. .................. 345/168 |
| 7,181,007 | B2 | * | 2/2007 | Gremo et al. ............ 379/433.07 |
| 7,312,790 | B2 | * | 12/2007 | Sato et al. ..................... 345/173 |
| 7,373,180 | B2 | * | 5/2008 | Swanson et al. .............. 455/566 |
| 2003/0220129 | A1 | | 11/2003 | Pan et al. |
| 2004/0077373 | A1 | * | 4/2004 | Choi et al. ................. 455/550.1 |
| 2005/0088416 | A1 | | 4/2005 | Hollingsworth |

FOREIGN PATENT DOCUMENTS

| EP | 0871236 B1 | 5/2005 |
| EP | 0928092 B1 | 12/2005 |
| GB | 2330979 A | 10/1997 |
| WO | 9726713 | 7/1997 |

(Continued)

*Primary Examiner* — Simon D Nguyen

(57) ABSTRACT

A communications device (125) and capacitor assembly (100) having a first capacitor electrode formed by a conductive keypad mount (110) coupled to a conductive part of a housing (120) of the communications device (125). The keypad mount (110) has keypad apertures (210) aligned with keys (140) of a keypad (145) and the conductive part of the housing (120) has an external housing covering insulator in the form of the window sub-housing (121). There is a circuit board (130) providing support for a second capacitor electrode (150). The circuit board (130) has an array of keypad actuators (135) aligned with the keys (140).

12 Claims, 4 Drawing Sheets

FOREIGN PATENT DOCUMENTS

| | | |
|---|---|---|
| WO | 9736380 | 10/1997 |
| WO | 9741717 | 11/1997 |
| WO | 9943040 | 8/1999 |
| WO | 9960660 | 11/1999 |

* cited by examiner

CAPACITOR ASSEMBLY AND COMMUNICATIONS DEVICE INCLUDING THE CAPACITOR ASSEMBLY

FIELD OF THE INVENTION

This invention relates to a capacitor assembly and a communications device including the capacitor assembly. The invention is particularly useful for, but not necessarily limited to, wireless communication devices with Global Positioning System (GPS) antennas.

BACKGROUND ART

Wireless communication devices often require multi-band antennas for transmitting and receiving radio communication signals often called Radio Frequency (RF) signals. For example, network operators providing service on a GSM system in a 900 MHz frequency band typically used in Asia also use a DCS system in a 1800 MHz frequency band typically used in Europe.

Current consumer requirements are for compact wireless communication devices that typically have a miniaturized antenna comprising an antenna radiator structure coupled to a ground plane, the ground plane being typically formed on or in a circuit board of the communications device. The antenna must be able to cover multiple frequency bands to, for instance, accommodate the 850 MHz, 900 MHz, 1800 Mhz and 1900 Mhz bands whilst being compact. Also, there has been a growing need to include a GPS capability on the device, to provide for a GPS capability a GPS antenna or antenna are required in addition to the miniaturized antenna described above. Such GPS antennas should be relatively efficient and stray or parasitic inductances caused by coupling to circuitry (typically also coupled to the miniaturized antenna), such as coupling from flexible connectors (ribbon cable), should be negated or at least reduced. To negate such parasitic inductances capacitors can be used, however conventional capacitors may need to be relatively large therefore requiring valuable space within the communications device.

In this specification, including the claims, the terms 'comprises', 'comprising' or similar terms are intended to mean a non-exclusive inclusion, such that a method or apparatus that comprises a list of elements does not include those elements solely, but may well include other elements not listed.

SUMMARY OF THE INVENTION

According to one aspect of the invention there is provided a capacitor assembly comprising: a first capacitor electrode formed by a conductive keypad mount coupled to a conductive part of a housing of a communications device, the keypad mount having keypad apertures aligned with keys of a keypad and the conductive part of the housing having an external housing covering insulator thereon; a circuit board with an array of keypad actuators thereon, the keypad actuators being aligned with the keys of the keypad; a second capacitor electrode; and a dielectric disposed between the first electrode and second electrode.

According to another aspect of the invention there is provided a communications device: at least one an antenna radiator element mounted in a housing of a communications device; a first capacitor electrode formed by a conductive keypad mount coupled to a conductive part the housing, the keypad mount having keypad apertures aligned with keys of a keypad and the conductive part of the housing having an external housing covering insulator thereon; a circuit board with an array of keypad actuators thereon, the keypad actuators being aligned with the keys of the keypad; a second capacitor electrode; and a dielectric disposed between the first electrode and second electrode, wherein the first capacitor electrode, the second capacitor electrode and the dielectric form a capacitor assembly coupled to the antenna radiator element.

Suitably, the conductive part of the housing at least partially surrounds a display screen window in the housing.

The conductive keypad mount may comprise a frame mounted to the housing.

The housing and keypad may provide an external first capacitor electrode covering insulator.

The frame may have at least one contact surface coupling the conductive keypad to the conductive part of the housing.

Suitably, the capacitor assembly is parasitically coupled to an antenna radiator element.

The capacitor assembly suitably forms part of the communications device and in use the capacitor assembly reduces the effects of parasitic inductances associated with the antenna radiator element.

The dielectric can be formed by at least a membrane forming part of the keypad.

Suitably, the second capacitor electrode is formed by at least a metal sheet.

The second capacitor electrode suitably has apertures therein allowing operative coupling of the keys with respective aligned said keypad actuators.

The second capacitor electrode may be supported by the circuit board.

Suitably, the first capacitor electrode has a larger effective surface are than that of the second capacitor electrode. The first capacitor electrode suitably has a tapered side adjacent the antenna radiator element, wherein an end of the radiator element furthest from an associated feed point is closest to the tapered side and an end of the radiator element closest to the feed point is furthest from the tapered side.

BRIEF DESCRIPTION OF THE DRAWINGS

In order that the invention may be readily understood and put into practical effect, reference will now be made to an exemplary embodiment as illustrated with reference to the accompanying drawings in which.

DETAILED DESCRIPTION

Figure 1:
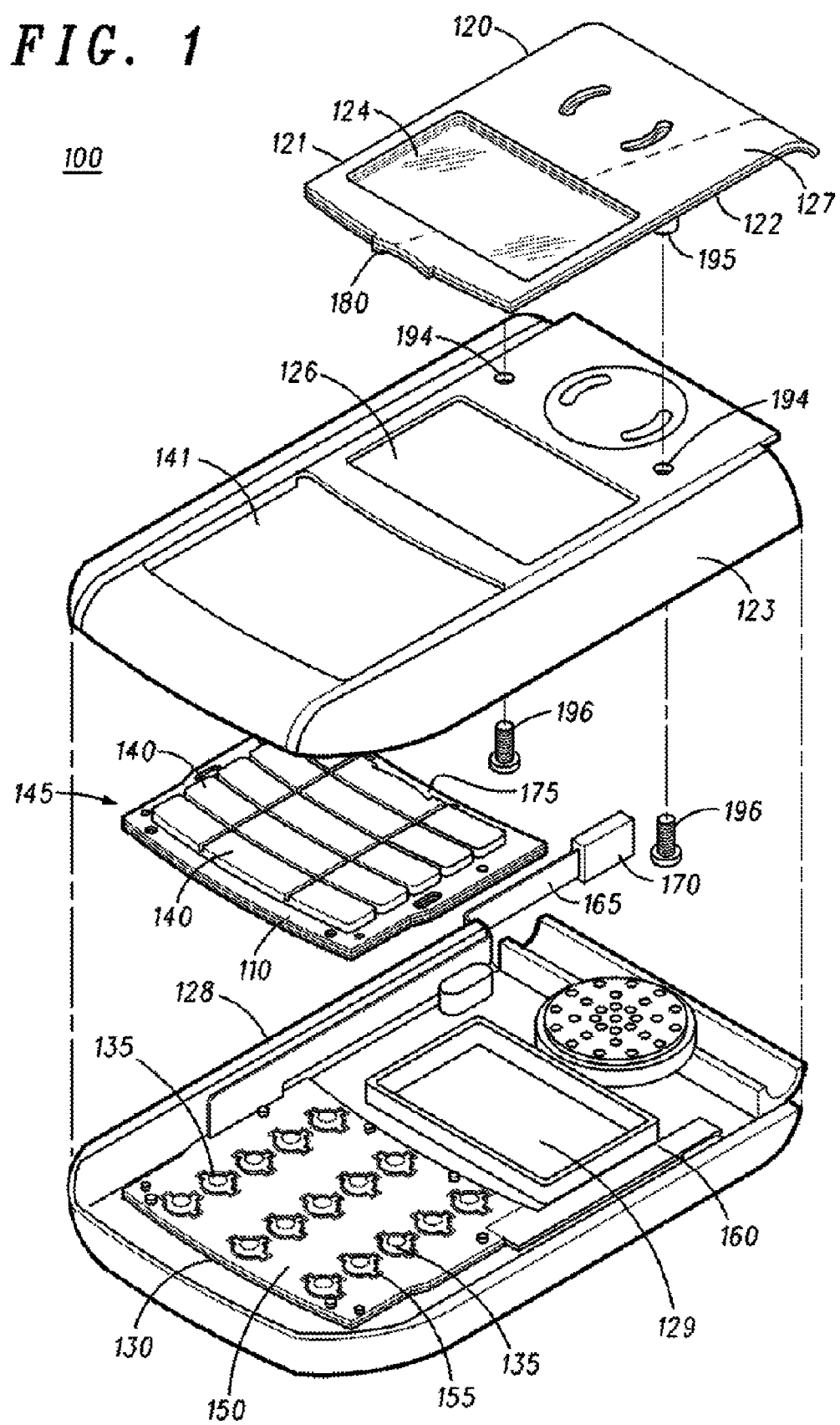
FIG. 1 is an upper exploded view of a capacitor assembly in accordance with an embodiment of the present invention.
Figure 2:
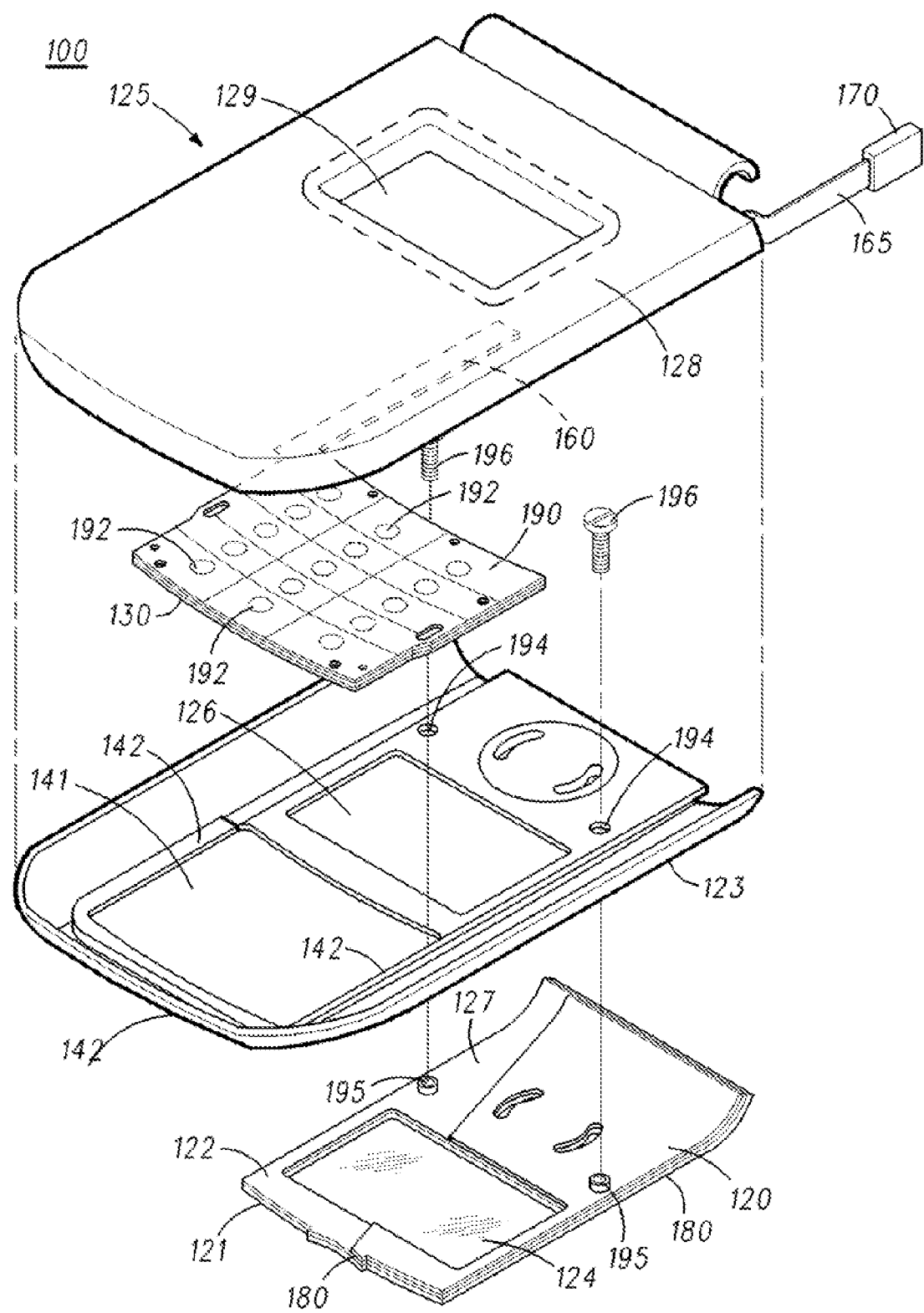
FIG. 2 is a lower exploded view of the capacitor assembly of FIG. 1.

In the drawings, like numerals on different Figs are used to indicate like elements throughout. With reference to FIGS. 1 and 2 there is illustrated upper and lower exploded views of an exemplary embodiment of a capacitor assembly 100. The capacitor assembly 100 includes a first capacitor electrode formed by a conductive keypad mount 110 and a conductive part of a housing 120 of a communications device 125. In this regard, as will be apparent to a person skilled in the art, only part of the communications device is illustrated.

The capacitor assembly 100 has a housing electrical contact surface 175 integrally formed as part of the conductive keypad mount 110. The housing electrical contact surface 175 is aligned to operatively engage a mount electrical contact surface 180 of the conductive part of the housing 120. The conductive part of the housing 120 is formed by a metallic coating applied to an underside 122 of a transparent plastics material providing a window sub-housing 121 that is mounted to a larger sub-housing 123. Accordingly, the conductive part of the housing 120 has an external housing covering insulator in the form of the window sub-housing 121.

The window sub-housing 121 has a display screen window region 124 aligned with a display screen aperture 126 in the larger sub-housing 123 and another display screen aperture 129 in a further larger sub-housing 128. The window sub-housing 121 has threaded blind apertured bosses 194 aligned with securing apertures 194 in the larger sub-housing 123. The threaded blind apertured bosses 194 and securing apertures 194 allow for fixing of the window sub-housing 121 to the larger sub-housing 123 by use screws 196. Also, the larger sub-housing 123 and further larger sub-housing 128 are fixed together by any known means such as screws and/or snap engagements. For aesthetic appeal, there may also be non-conductive paint 127 applied to the window sub-housing 121, however, as will be apparent to a person skilled in the art the non-conductive paint 127 will surround but not cover the window region 124. Furthermore, the conductive part of the housing 120 surrounds, or as illustrated partially surrounds the window region 124. Also, as will be apparent to a person skilled in the art, the window sub-housing 121 and larger sub-housings 123, 128 form a flip or cover pivotally mounted to another housing with which resides a display such that when the flip is in a closed position the display can be viewed through the display screen window region 124.

The larger sub-housing 123 also has a keypad receiving aperture 141 with an enclosing rim 142 adjacent three sides of the aperture 141. This rim 142 is configured to engage and with the keypad mount 110 as described below.

The capacitor assembly 100 also includes a circuit board 130 with an array of keypad actuators 135 that are typically poppel switch assemblies, however, other types of switch assemblies can be used. The keypad actuators 135 are aligned with keys (buttons) 140 of a keypad 145 mounted to the conductive keypad mount 110.

There is also a second capacitor electrode formed by a metal sheet 150 supported by the circuit board 130. The metal sheet 150 has apertures 155 therein allowing operative coupling of the keys 140 with respective aligned keypad actuators 135. As illustrated, a membrane 190 forms a dielectric that is disposed between the first capacitor electrode formed by the conductive keypad mount 110 and the conductive part of the housing 120 and the second capacitor electrode formed by the metal sheet 150. Hence, the membrane 190 has membrane sections 192 that are essentially part of the keypad 145. The membrane sections 192 associated with a respective one of the keys 140, in use, operatively engage with respective keypad actuators 135 to provide input commands along with text and numeric data. By visually comparing the surface area of the first capacitor electrode with the second capacitor electrode, it will be apparent that the first capacitor electrode has a larger effective surface are than that of the second capacitor electrode.

There is at least one Global Positioning System (GPS) antenna radiator element 160 formed on the circuit board 130 by techniques that are known to a person skilled in the art. The antenna radiator element 160 is mounted in the housing of the communications device, wherein the housing in this embodiment comprises at least the sub-housings 121, 123, 128. Furthermore, a flexible connector 165 allows for operatively engaging a socket (not shown) on the circuit board 130. This flexible connector 165 provides for coupling the circuit board 130 to other circuitry (not shown) of the communications device 125 via an associated plug in connector 170.

Figure 3:
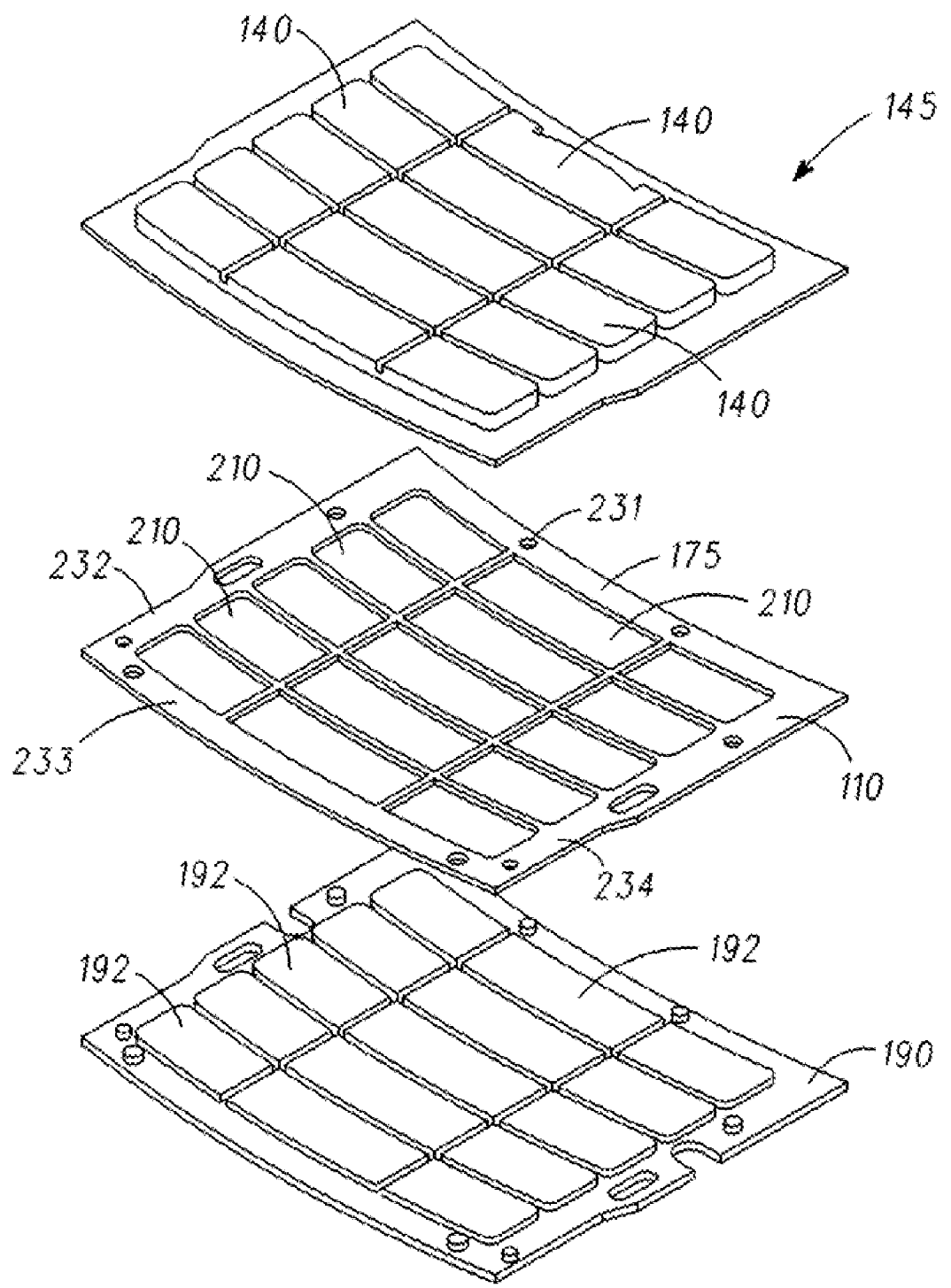
FIG. 3 is an exploded view of a conductive keypad mount, keypad and membrane of the capacitor assembly of FIG. 1.

Referring to FIG. 3 there is illustrated an exploded view of the conductive keypad mount 110, keypad 145 and membrane 190. The conductive keypad mount 110 is formed from a flexible metal sheet having keypad apertures 210 accommodating and aligned with the keys 140 of the keypad 145. The membrane 190 comprises a flexible rubberized material and forms part of the keypad 145 in which respective areas of the keys 140 are affixed to projections of the membrane sections 192 that protrude through the keypad apertures 210. In this regards, the membrane sections 192 are bonded where they abut a respective underside of the keys 140. The keypad mount 110 comprises a frame with four sides 231,232,233, 234 and one of the sides 231 includes the housing electrical contact surface 175.

Figure 4:
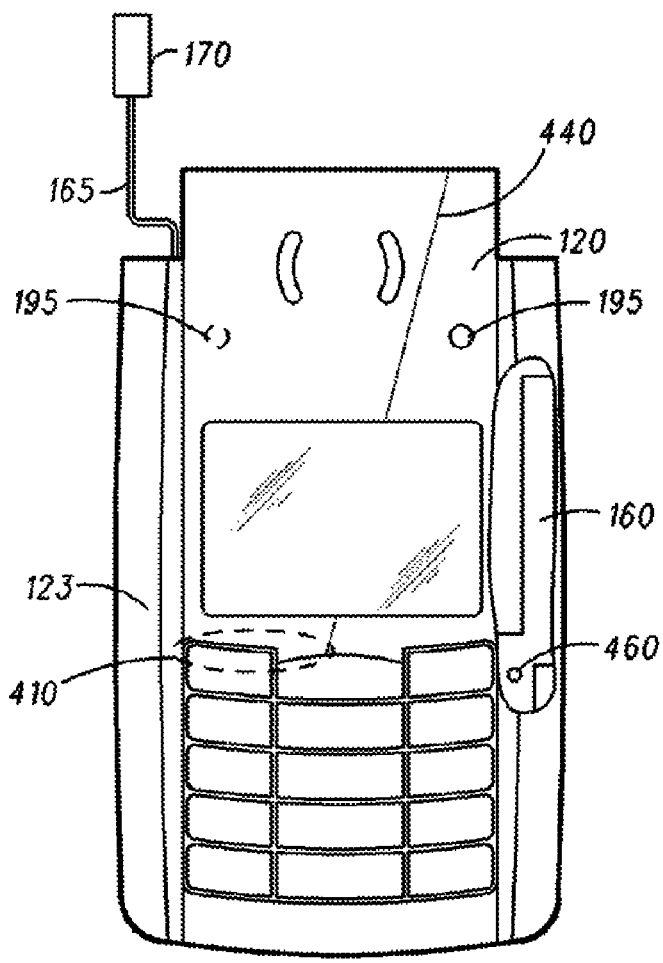
FIG. 4 is a plan view of part of the capacitor assembly of FIG. 1.

Referring to FIG. 4 there is illustrated a plan view of part of the capacitor assembly 100 and for ease of illustration the non conductive paint 127 is omitted and a section of sub-housing 123, covering the antenna 160, has been cut-away. As illustrated, the first capacitor electrode formed by the conductive keypad mount 100 is coupled to the conductive part of the housing 120 by the housing electrical contact surface 175 abutting the mount electrical contact surface 180 of the conductive part of the housing 120. More specifically, the conductive keypad mount 100 is coupled to the conductive part of the housing 120 at a contact surface region indicated by reference number 410. The keypad mount 110 is mounted to the larger sub-housing 123 by the sides 232,233,234 engaging the enclosing rim 142. Hence, the keypad 145 is located in the keypad receiving aperture 141. Also, the window sub housing 121 is fixed to the larger sub-housing 123 by the securing screws 196 passing through the securing apertures 194 and engaging the threaded blind apertured bosses 194 in the window sub housing 121. The keys 140 are formed from a non-conductive material and therefore the keypad and window sub-housing 121 provide an external first capacitor electrode covering insulator. Thus, in use, significant variations in capacitance can be alleviated external first capacitor electrode covering insulator electrically isolating user contact with the first capacitor electrode.

Part of first capacitor electrode, namely the conductive part of the housing 120, has a tapered side 440 adjacent the antenna radiator element 160, wherein an end of the radiator element furthest from an associated feed point 460 is closest to the tapered side 440 and an end of the radiator element 160 closest to the feed point 460 is furthest from the tapered side. The reason for tapering the tapered side 440 as described is due to current that excites the antenna radiator element 160 has maximum amplitude adjacent the feed point 460. This tapered side 460 therefore reduces interference and antenna de-sensitizing caused by cross coupling of the antenna radiator element 160 and first capacitor electrode. Also, since the first capacitor electrode is has a relatively large surface area then it can be modified in size and shape to assist in tuning the capacitor assembly 100. For instance, the shape of the tapered side 460 can be modified or the size of the keypad apertures 210 can be adjusted or the width of one or more of the sides 231, 232, 233, 234 of the keypad mount 110n can be altered.

Figure 5:
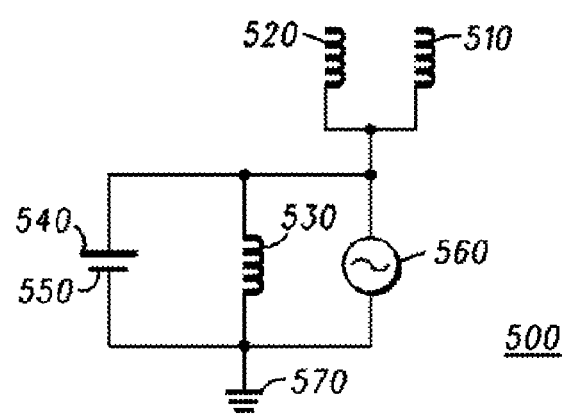
FIG. 5 illustrates a schematic electrical equivalent circuit of the assembly of FIG. 1 when coupled to an antenna radiator element and associated communications circuitry of a wireless communications device.

Referring to FIG. 5 there is illustrated a schematic electrical equivalent circuit 500 of the capacitor assembly 100 when coupled to the antenna radiator element 160 and associated communications circuitry of a wireless communications device 125. The equivalent circuit 500 comprises two GPS antennas 510, 520 representing the least one Global Positioning System (GPS) antenna radiator element 160. There is an exciting source 560 representing the feed point 460 coupling the antennas 510, 520 to ground 570. In parallel with the exciting source 560 is a parasitic inductance 530 caused primarily by the flexible connector 165. It will be appreciated that since the GPS antenna radiator element 160 operates at a high Frequency, typically at 1450 MHz, then a small amount of the parasitic inductance 530 parallel to the exciting source 560 can significantly short (or bypass) energy feeding the antenna radiator element 160. Therefore, the affects of the parasitic inductance 530 is reduced significantly by the capacitor assembly 100.

The first capacitor electrode is represented by a large electrode 540 coupled to the antennas 510, 520 and the second capacitor electrode represented by a small electrode 550 is coupled to the ground plane 570. Accordingly, electrodes 540, 550 form the capacitor assembly 100 that is parasitically coupled in parallel the parasitic inductance 530. Also, it will be apparent to a person skilled in the art that the capacitor assembly 100 is parasitically coupled to the antenna radiator element 160. The capacitor assembly 100 forms part of the communications device 125 and in use the capacitor assembly 100 reduces the effects of the parasitic inductance 530.

Advantageously, the present invention provides for a capacitor assembly for alleviating the effects of parasitic inductances in wireless communications devices. The capacitor assembly requires a relatively small space and therefore it is suitable for miniaturized ireless communications devices.

The detailed description provides an exemplary only, and is not intended to limit the scope, applicability, or configuration of the invention. Rather, the detailed description of the exemplary embodiment provides those skilled in the art with an enabling description only. It should be understood that various changes may be made in the function and arrangement of elements without departing from the spirit and scope of the invention as set forth in the appended claims.

We claim:

1. A communications device including a capacitor assembly comprising:
    a housing;
    a first capacitor electrode formed by a conductive keypad mount coupled to a conductive part of the housing of the communications device, wherein the first capacitor electrode is carried in the housing, the keypad mount having keypad apertures aligned with keys of a keypad and the conductive part of the housing having an external housing covering insulator thereon;
    a circuit board carried in the housing, the circuit board including an array of keypad actuators thereon, the keypad actuators being aligned with the keys of the keypad;
    a second capacitor electrode carried in the housing;
    a dielectric disposed between the first capacitor electrode and the second capacitor electrode; and
    an antenna radiator element mounted in the housing, wherein the first capacitor electrode, the second capacitor electrode, and the dielectric form the capacitor assembly, wherein the capacitor assembly is parasitically coupled in parallel to the antenna radiator element.

2. A communications device as claimed in claim 1, wherein the conductive part of the housing at least partially surrounds a display screen window in the housing.

3. A communications device as claimed in claim 1, wherein the conductive keypad mount comprises a frame mounted to the housing.

4. A communications device as claimed in claim 3, wherein the frame has at least one contact surface coupling the conductive keypad to the conductive part of the housing.

5. A communications device as claimed in claim 1, wherein the housing and keypad provide an external first capacitor electrode covering insulator.

6. A communications device as claimed in claim 1, wherein the capacitor assembly, in use, reduces the effects of parasitic inductances associated with the antenna radiator element.

7. A communications device as claimed in claim 1, wherein dielectric is formed by at least a membrane forming part of the keypad.

8. A communications device as claimed in claim 1, wherein the second capacitor electrode is formed by at least a metal sheet.

9. A communications device as claimed in claim 8, wherein the second capacitor electrode has apertures therein allowing operative coupling of the keys with respective aligned said keypad actuators.

10. A communications device as claimed in claim 1, wherein the second capacitor electrode is supported by the circuit board.

11. A communications device as claimed in claim 1, wherein the first capacitor electrode has a larger effective surface are than that of the second capacitor electrode.

12. A communications device as claimed in claim 1, wherein the first capacitor electrode has a tapered side adjacent the antenna radiator element, wherein an end of the radiator element furthest from an associated feed point is closest to the tapered side and an end of the radiator element closest to the feed point is furthest from the tapered side.

* * * * *